(12) United States Patent
Saito (10) Patent No.: US 6,219,092 B1
(45) Date of Patent: Apr. 17, 2001

(54) IMAGE PICKUP APPARATUS FOR IMAGE FILM

(75) Inventor: Etsuro Saito, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/111,722

(22) Filed: Jul. 8, 1998

(30) Foreign Application Priority Data

Jul. 9, 1997 (JP) .................................................. 9-184151

(51) Int. Cl.[7] .................................................. H04N 5/253
(52) U.S. Cl. .................................................. 348/96
(58) Field of Search .................................................. 348/95, 96, 97, 348/98, 99, 208, 210, 219, 112; 355/18

(56) References Cited

U.S. PATENT DOCUMENTS

| | | | |
|---|---|---|---|
| 5,644,356 | * | 7/1997 | Swinson et al. .................................................. 348/96 |
| 5,729,284 | * | 3/1998 | Ishii et al. .................................................. 348/96 |
| 5,745,214 | * | 4/1998 | Yokonuma et al. .................................................. 355/18 |
| 5,751,343 | * | 5/1998 | Hibino et al. .................................................. 348/96 |
| 5,808,667 | * | 9/1998 | Sugiyama .................................................. 348/96 |
| 5,864,362 | * | 1/1999 | Cutler .................................................. 348/96 |
| 5,889,553 | * | 3/1999 | Kino et al. .................................................. 348/218 |
| 6,018,363 | * | 1/2000 | Horii .................................................. 348/219 |

\* cited by examiner

*Primary Examiner*—Chris Kelley
*Assistant Examiner*—Tung Vo
(74) *Attorney, Agent, or Firm*—Frommer Lawrence & Haug, LLP.; William S. Frommer; Glenn F. Savit (57) ABSTRACT

With one single apparatus, process of converting images recorded on a movie film into video signals in real time and process of converting images recorded on a movie film into video signals with high resolution can be implemented. A user selects a first operation mode and a second operation mode by a mode changeover switch. In the first operation mode, images of respective frames of the movie film are sequentially picked up in real time and correction of image shift is made by an optical axis correction part. In the second operation mode, to the same frame of a movie film, a plurality of optical axis positions differing by an amount corresponding to a half of the pixel pitch in the image pickup device are selected with the optical axis correction part, and, for respective optical axis positions, the image of the same frame is picked up, and for respective optical axis positions the image of the frame is picked up.

12 Claims, 6 Drawing Sheets

FIG.6A control signal S5

FIG.6B readout pulse

FIG.7

FIG.8A control signal S5

FIG.8B vertical deflection signal S3

FIG.8C horizontal deflection signal S4

FIG.8D readout pulse

IMAGE PICKUP APPARATUS FOR IMAGE FILM

BACKGROUND OF THE INVENTION

1. Field of the Invention

The present invention relates to an image pickup apparatus for converting images recorded on a film such as a movie film into video signals.

2. Description of the Related Art

Conventionally, a telecine apparatus is known as an apparatus for converting images recorded on a movie film into video signals. There are two types of telecine apparatuses. One type is of feeding a movie film continuously. The other type is of feeding a movie film intermittently. For example, in an intermittent feeding type telecine apparatus, a movie film is fed frame by frame intermittently. One frame of the images recorded on the movie film is positioned on an optical axis of a lens of a camera part. Light from a light source is irradiated to the movie film to cause light transmitted therethrough to be incident on a video part. One frame of the images recorded on the movie film is picked up by the video part. After picking up one frame of the images, the movie film is fed and the next frame is positioned in the optical axis of the lens, and the same image pickup as set forth above is repeated. In such a telecine appratus, process of converting images recorded on a movie film into video signals is performed in real time for example by moving the movie film by 24 frames per second.

In the telecine apparatus described above, as an image pickup means in the camera part, an image pickup device such as a CCD (charge coupled device) is utilized. In such case, resolution of video signals obtained therethrough is limited by the number of pixels in the image pickup device.

In recent years, in the field of movie production, image processing is performed after converting images recorded on a film into video signals. In this field, high resolution and high picture quality are also required for video signals obtained from images recorded on a film. For this task, the number of pixels in CCD is not sufficient. Therefore, a telecine apparatus has a problem that it is also insufficient in resolution to be used for movie production which requires high resolution.

On the other hand, in the field of movie production described above or the like which requires high resolution and high picture quality, as an apparatus for converting images recorded on a movie film to video signals, a super high picture quality image pickup device called film scanner is utilized. In the film scanner, different from telecine apparatus, process of converting images recorded on a movie film into video signals is not performed in real time, but rather, by spending a sufficiently longer time.

However, a film scanner has a problem that it is expensive in particular in image pickup system in order to realize super high picture quality. Also, in a film scanner, of course, it is impossible to convert images recorded on a movie film into video signals in real time as in a telecine apparatus.

Therefore, there is a problem that those who sometimes want to convert pictures recorded on a movie film into video signals in real time and sometimes want to convert pictures recorded on a movie film into video signals with high resolution must provide both telecine apparatus and expensive film scanner.

SUMMARY OF THE INVENTION

The present invention is made in view of these problems, and the object of the invention is to provide an image pickup apparatus which can implement, with one single apparatus, process of converting images recorded on a film such as a movie film into video signals in real time and process of converting images recorded on a film into video signals with high resolution.

An image pickup apparatus for image film according to the invention comprises a film feeding means capable of intermittently feeding a film on which information including image information is recored so as to intermittently stop each frame of the film at a predetermined image pickup position, a light irradiating means for irradiating light to the frame of the film stopped at the image pickup position, an image pickup means for picking up an image of the frame of the film which stopped at the image pickup position and to which light is irradiated by said light irradiating means and for converting the image into a video signal, an optical axis position moving means capable of moving an optical axis position of a light from the frame of the film stopped at the image pickup position to the image pickup means, and a control means for controlling said film feeding means, image pickup means and optical axis position moving means and capable of selecting a first operation mode in which said film is intermittently fed by said film feeding means and images of respective frames of said film are sequentially picked up by the image pickup means, and a second operation mode in which, to the same frame of said film stopped at the image pickup position, a plurality of optical axis positions are selected with said optical axis position moving means, and, for respective optical axis positions, the image of the frame is picked up by the image pickup means.

In an image pickup apparatus according to the invention, the first operation mode or the second operation mode is selected by the control means. In the first operation mode, a film is intermittently fed by a film feeding means and images of respective frames of the film are sequentially picked up by the image pickup means. Thus, process of converting images recorded on the film into video signals in real time can be performed. In the second operation mode, to the same frame of a film stopped at an image pickup position, a plurality of optical axis positions are selected with the optical axis position moving means, and, for respective optical axis positions, image of the frame is picked up by the image pickup means, thereby enabling process of converting images recorded on the movie film into video signals with high resolution to be performed.

Other and further objects, features and advantages of the invention will appear more fully from the following description.

DETAILED DESCRIPTION OF THE PREFERRED EMBODIMENT

A preferred embodiment of the invention will now be described in detail with reference to the accompanying drawings.

Figure 1:
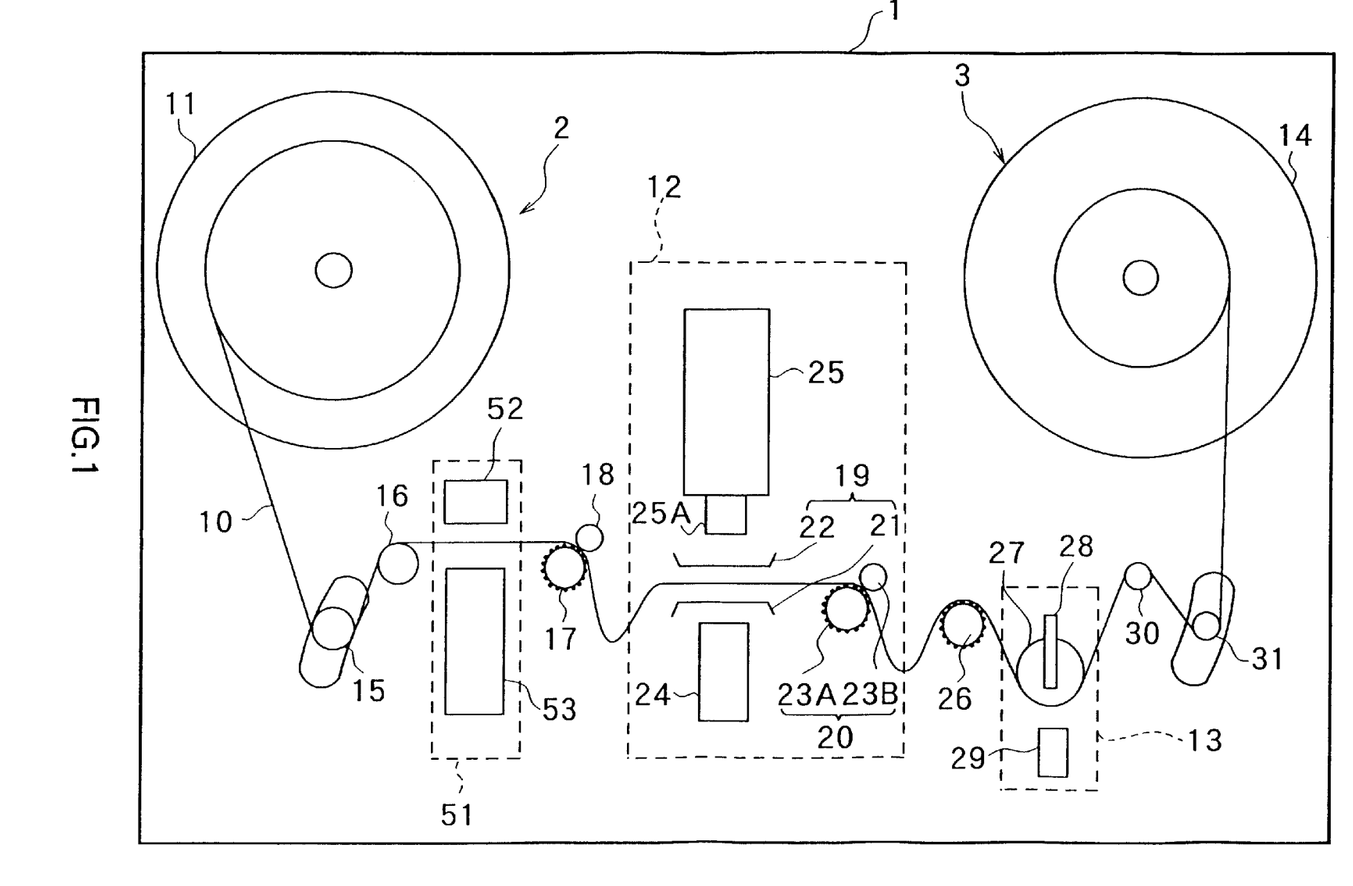
FIG. 1 is an explanatory view showing schematic structure of a telecine apparatus according to an embodiment of the invention.

FIG. 1 is an explanatory view showing schematic structure of a telecine apparatus according to an embodiment of the invention. The telecine apparatus comprises a supply reel attaching part 2 to which a supply reel 11 for supplying a movie film 10 on which video and audio information are optically recorded is attached, a digital audio reproducing part 51 for reproducing digital audio information recorded on the movie film 10 supplied through rollers 15 and 16 from the supply reel 11, a video reproducing part 12 for reproducing video recorded on the movie film 10 supplied through between a sprocket 17 and a sprocket shoe 18 after passing through the digital audio reproducing part 51, an analog audio reproducing part 13 for reproducing analog audio information recorded on the movie film 10 supplied through a sprocket 26 after passing through the video reproducing part 12, and a takeup reel attaching part 3 to which a takeup reel 14 for taking up the movie film 10 through rollers 30 and 31 after passing through the analog audio reproducing part 13.

The video reproducing part 12 has a CCD (charge coupled device) camera 25 for photoelectrically converting images recorded on the movie film 10 supplied from the sprocket 17 and the sprocket shoe 18, a lamp house part 24 which irradiates light beam for projecting the images, a gate part 19 provided between the CCD camera 25 and the lamp house part 24, and an intermittent feeding part 20 for intermittently feeding the movie film 10.

The gate part 19 sandwiches both ends in the direction of the width of the movie film 10 between a picture gate 21 and a pressure plate 22. In the gate part 19, an aperture is provided as an image pickup position at which respective frames of the movie film 10 are intermittently stopped. The intermittent feeding part 20 sandwiches the movie film 10 between an intermittent feeding sprocket 23A and an intermittent feeding sprocket shoe 23B. In a first operation mode which will be described later, the intermittent feeding sprocket 23A sequentially rotates by a predetermined angle at a predetermined timing, whereby respective frames of the movie film 10 intermittently (for example at a rate of 24 times per second) stop sequentially at the aperture in the gate part 19.

The digital audio reproducing part 51 comprises a light source 52 for irradiating light beam to a region of the movie film 10 to which digital audio is recorded, and a digital audio sensor 53 for receiving light transmitted therethrough with a photoelectrical conversion device (not shown).

The analog audio reproducing part 13 comprises a drum 27 to with which the movie film 10 sent from the intermittent feeding part 20, a light source 28 for irradiating light beam to a region of the movie film 10 to which analog audio is recorded, and an analog audio sensor 29 for receiving light transmitted therethrough with a photoelectrical conversion device (not shown).

Figure 2:
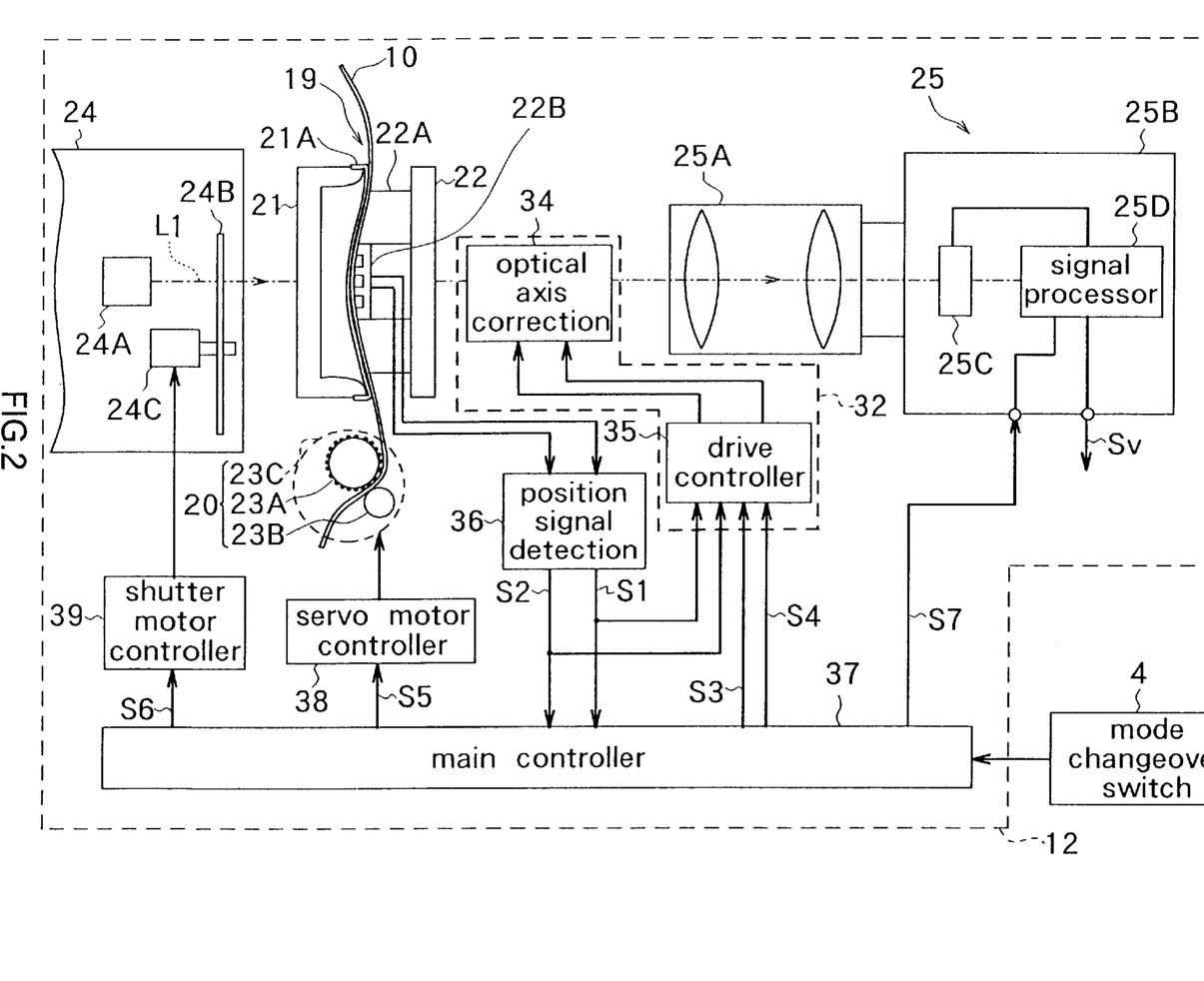
FIG. 2 is a block diagram of structure of the video reproducing part shown in FIG. 1.

FIG. 2 is a block diagram of structure of the video reproducing part 12 shown in FIG. 1. The video reproducing part 12 comprises a CCD camera 25 for photoelectrically converting images recorded on the movie film 10, a lamp house part 24 which irradiates light beam for projecting the images, a gate part 19 provided between the CCD camera 25 and the lamp house part 24, an intermittent feeding part 20 for intermittently feeding the movie film 10, and an optical axis control part 32 for controlling an optical axis of light beam from the lamp house part 24. The video reproducing part 12 further comprises a position signal detecting part 36 connected to a position detection sensor, which will be described later, provided in the gate part 19, a servo motor control part 38 for controlling the intermittent feeding part 20, a shutter motor control part 39 connected to the lamp house part 24, and a main control part 37 for controlling the whole video reproducing part 12.

The lamp house part 24 has a light source 24A as a light irradiating means, a projection shutter 24B to be repeatedly opened or closed with an interlocked relationship with an intermittent feeding operation of the movie film 10, and a motor 24C to be driven and controlled by the shutter motor control part 39. Light for projection (hereinafter referred to as "projection light") L1 is incident on the movie film 10 through the projection shutter 24B and an aperture provided on a surface of the picture gate oppostite to the movie film 10. The shutter motor control part 39 drives and controls motor 24C to rotate sequentially by a predetermined angle at a predetermined timing based on a control signal S6 sent from the main control part 37. The projection shutter 24B repeats open or close operation based on this control signal.

The gate part 19 has a steel band 21A and a guide shoe 22A for sandwiching both ends in the direction of the width of the movie film 10, and a position sensor 22B for detecting the position of a perforation of the film. The position sensor 22B is a sensor for example of electrostatic capacitance type, and detects signal corresponding to positional shifts in longitudinal direction (vertical direction) of the screen and the direction of the width (horizontal direction) of the screen from the stop position of the movie film 10 on the basis of the aperture, and when the movie film 10 is intermittently fed, outputs these signals to the position signal detection part 36. The position signal detection part 36 generates, based on signals from the film position sensor 22B, a vertical positional shift signal S1 representing a positional shift in vertical direction of the screen and a horizontal positional shift signal S2 reprsenting a positional shift in horizontal direction of the screen, and outputs these signals to the drive control part 35 and the main control part 37.

The CCD camera 25 comprises a lens part 25A for focusing light trasmitted through a region (frame) of the movie film 10 on which an image is recorded and a body 25B. The body 25B has an image pickup device 25C using a CCD which receives transmitted light from the lens part 25A and picks up the image, and a signal processing part 25D for processing an output signal from the image pickup device 25C and for outputting a video signal Sv outside.

The optical axis control part 32 has an optical axis correction part 34, interposed between the gate part 19 and the lens part 25A, capable of moving an optical axis position of a light from the frame of the film which stopped at the image pickup position to the lens part 25, and a drive control part 35 for controlling the optical axis correction part 34. In the optical axis control part 32, the control part 35 controls the optical axis correction part 34 so as to change optical axis position of the projection light L1 based on the vertical positional shift signal S1 and the horizontal positional shift signal S2 from the position signal detection part 38 or on a vertical deflection signal S3 and a horizontal deflection signal S4.

The main control part 37 outputs a vertical deflection signal S3 for deflecting the optical axis in the vertical direction of the screen and a horizontal deflection signal S4 for deflecting the optical axis in the horizontal direction of the screen to the drive control part 35 in the optical axis control part 32. A mode changeover switch 4 for switching a first operation mode and a second operation mode is connected to the main control part 37. The first operation mode is a mode in which images of respective frames of the movie film 10 are sequentially picked up in real time and a shift of relative positional relationship between the frame of the movie film 10 at the image pickup position and the CCD camera 25 is corrected. The second operation mode is a mode in which, to the same frame of the movie film 10, by the optical axis correction part 34, a plurality of optical axis positions shifted by an amount corresponding to a half of the pixel pitch in the image pickup device 25C are selected, the same frame is picked up for respective optical axis positions, video signals corresponding to the plurality of images obtained are synthesized so as to produce one piece of image information of high resolution. These operation modes are selected by the mode changeover switch 4. The main control part 37 outputs, depending on the operation mode selected by the mode changeover switch 4, a mode signal S7 for switching to that mode in order to control the CCD camera 25, to the signal processing part 25D in the camera body 25B. The main control part 37 further sends a control signal S5 to the servo motor control part 38. The servo motor control part 38 controls the servo motor 23C for driving the intermittent feeding part 20 based on the control signal S5.

Figure 3A:
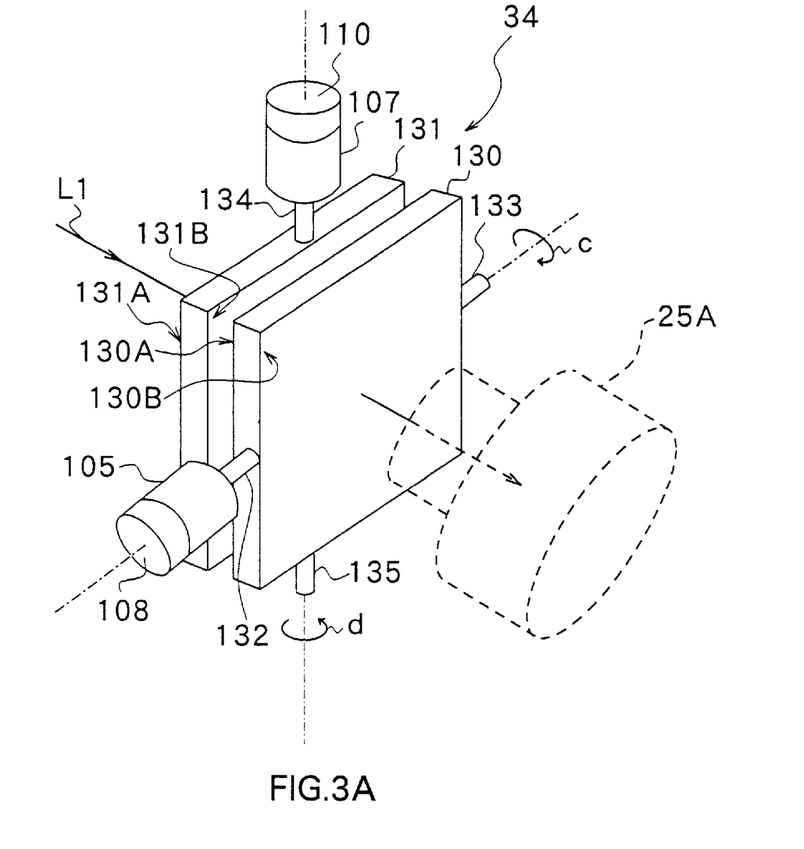
FIG. 3A is a perspective view showing structure of the optical axis correction part shown in FIG. 2.

FIG. 3A is a perspective view showing structure of the optical axis correction part 34 shown in FIG. 2. The optical axis correction part 34 has a first plate 130 and a second plate 131 which are formed with glass members having the same refractive index and arranged substantially parallel with each other. Coaxial shafts 132 and 133 are made integral and attached to the first plate 130, at one side end part and the other side end part. An output shaft of a motor 105 provided in the drive control part 35 is connected to the shaft 132. Thus, by rotating the motor 105, the first plate 130 is swung in the direction shown by an arrow c or in the reverse direction thereto about the shafts 132 and 133.

Similarly, coaxial shafts 134 and 135 are made integral and attached to the second plate 131, at one side end part and the other side end part. An output shaft of a motor 107 provided in the drive control part 35 is connected to the shaft 134. Thus, by rotating the motor 107, the second plate 131 is swung in the direction shown by an arrow d or in the reverse direction thereto about the shafts 134 and 135.

The output shafts of the motors 105 and 107 are arranged to be perpendicular to each other. A position sensor 108 is provided to the motor 105 for detecting an angle of rotation of the shaft 132, i.e. an angle of swing of the first plate 130. Similarly, a position sensor 110 is provided to the motor 107 for detecting an angle of rotation of the shaft 134, i.e. angle of swing of the second plate 131.

Figure 3B:
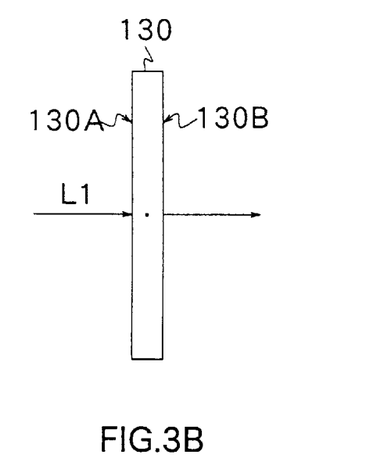
FIGS. 3B and 3C are explanatory views for explaining operation of the optical axis correction part.
Figure 3C:
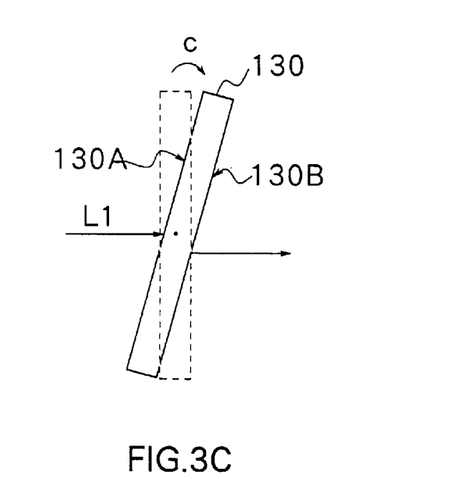

Relationship between an angle of swing of the first plate 130 of the optical axis correction part 34 and amount of movement of the optical axis of the projection light L1 will be explained below with FIGS. 3A to 3C. Explanation of the second plate 131 is omitted because the second plate 131 is similar to the first plate 130. For example, given that a plane of the first plate 130 opposite to the lens part 25A is referred to as outer plane part 130A and a plane of the first plate 130 on the lens 25A side is referred to as inner plane part 130B, when the first plate 130 is perpendicular to the optical axis on the outer plane part 130A side, the optical axis on the outer plane part 130A side coincides with the optical axis on the inner plane part 130B side (see FIG. 3B). If the first plate 130 is swung about the shafts 132 and 133 in the direction shown by an arrow c or the reverse direction thereto from this state, the optical axis on the inner plane part 130B side translates with respect to the optical axis on the outer plane part 130A side (see FIG. 3C). For example, assuming that when the first plate 130 is inclined by 10 degrees, the optical axis moves for 180 $\mu$m and that pixel pitch in the image pickup device is 11.5 $\mu$m per pixel, the first plate 130 needs to be inclined only approximately 0.32 degrees in order to move the optical axis by a half of the pixel pitch in the second operation mode.

Figure 4:
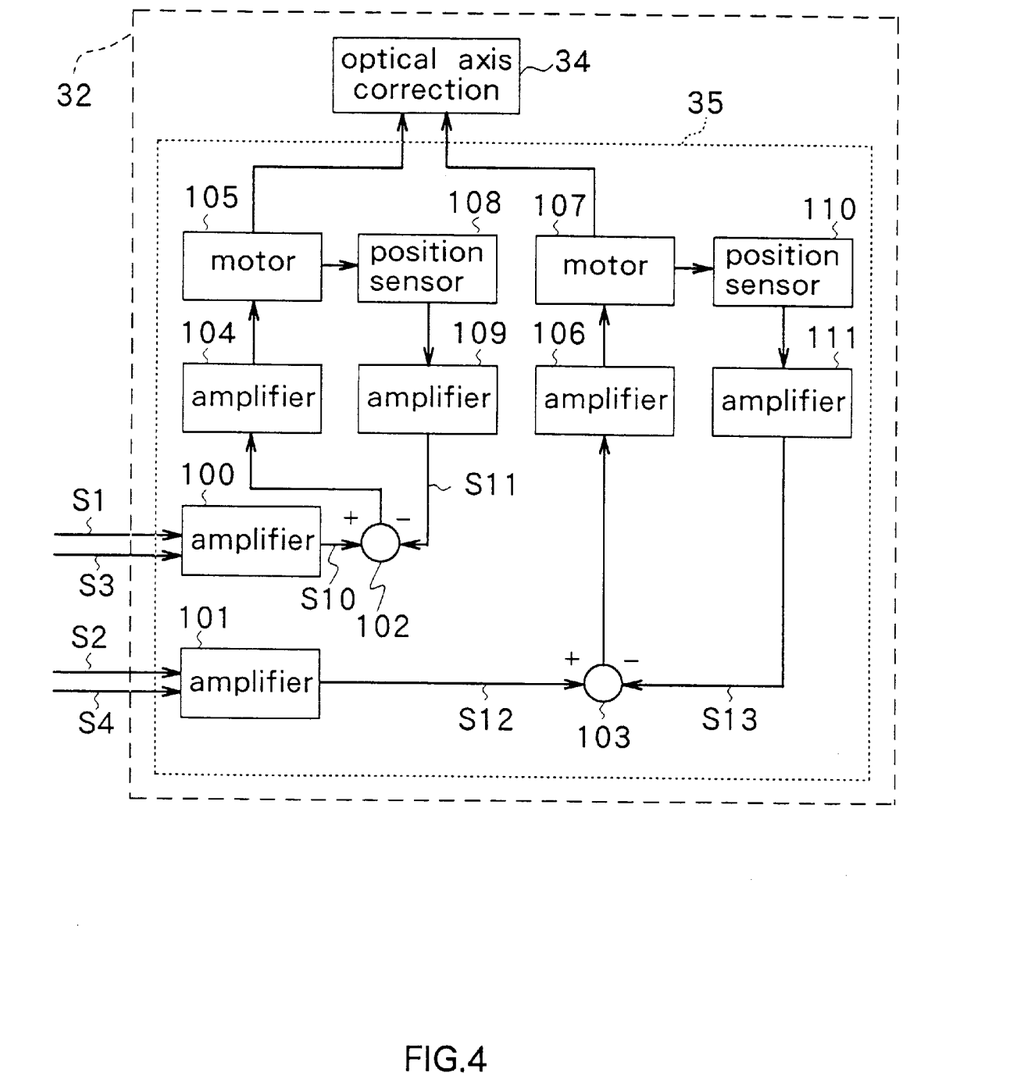
FIG. 4 is a block diagram showing structure of the opticals axis control part shown in FIG. 2.

FIG. 4 is a block diagram showing structure of the optical axis control part 32 shown in FIG. 2. The opticals axis control part 32 comprises the optical axis correction part 34 and the drive control part 35 described above. The drive control part 35 has, in addition to the motor 105 and the position sensor 108 described above, an amplification circuit 100 for amplifying the vertical positional shift signal S1 or the vertical deflection signal S3 inputted thereto so as to be outptted as a target position signal S10, an amplification circuit 109 for amplifying an output signal from the position sensor 108 so as to be outputted as a current position signal S11, a subtraction circuit 102 for calculating the difference between an output signal from the amplification circuit 100 and an output signal from the amplification circuit 109, and an amplification circuit 104 for amplifying an output signal from the subtraction circuit 102 and providing the amplified signal to the motor 105.

The drive control part 35 further has, in addition to the motor 107 and the position sensor 110 described above, an amplification circuit 101 for amplifying the horizontal positional shift signal S2 or the horizontal deflection signal S4 inputted thereto so as to be outputted as a target position signal S12, an amplification circuit 111 for amplifying an output signal from the position sensor 110 so as to be outputted as a current position signal S13, a subtraction circuit 103 for calculating the difference between an output signal from the amplification circuit 101 and an output signal from the amplification circuit 111, and an amplification circuit 106 for amplifying an output signal from the subtraction circuit 103 and providing the amplified signal to the motor 107.

In case the first operation mode has been selected by the mode changeover switch 4, the optical axis correction part 4 performs correction control of the shift of the image based on the vertical positional shift signal S1 and the horizontal positional shift signal S2. In other words, the vertical positional shift signal S1 and the horizontal positional shift signal S2 from the position signal detection part 36 are inputted to the amplification circuits 100 and 101 respectively and are amplified and outputted to the subtraction circuits 102 and 103 as target position signals S10 and S12. On the other hand, output signals from the position sensors 108 and 110 corresponding to angles of swing of the plates 130 and 131 are respectively inputted to the amplification circuits 109 and 111 and are amplified and outputted to the subtraction circuits 102 and 103 as current position signals S11 and S13. The subtraction circuits 102 and 103 calculate the difference between the target position signal S10 and the current position signal S11 and the difference between the target position signal S12 and the current position signal S13 respectively, and output these differences to the amplification circuits 104 and 106. The amplification circuits 104 and 106 amplify output signals from the subtraction circuits 102 and 103 respectively, and outputs the amplified signals to the motors 105 and 107. The motor 105 swings the first plate 130 of the optical axis correction part 34 by an amount corresponding to the difference inputted from the amplification circuit 104. On the other hand, the motor 107 swings the plate 131 by an amount corresponding to the difference inputted from the amplification circuit 106.

In case the second operation mode has been selected by the mode changeover switch 4, the optical axis correction part 4 performs control of pixel shift based on the vertical deflection signal S3 and the horizontal deflection signal S4. In other words, the vertical deflection signal S3 and the horizontal rdeflection S4 from the main control part 37 are inputted to the amplification circuits 100 and 101 respectively and are amplified and outputted to the subtraction circuits 102 and 103 as target position signals S10 and S12. On the other hand, output signals from the position sensors 108 and 110 corresponding to angles of rotation of the shafts 130 and 131 are respectively inputted to the amplification circuits 109 and 111 and are amplified and outputted to the subtraction circuits 102 and 103 as current position signals S11 and S13. The subtraction circuits 102 and 103 calculate the difference between the target position signal S10 and the current position signal S11 and the difference between the target position signal S12 and the current position signal S13 respectively, and output these differences to the amplification circuits 104 and 106. The amplification circuits 104 and 106 amplify output signals from the subtraction circuits 102 and 103 respectively, and outputs the amplified signals to the motors 105 and 107. The motor 105 swings the first plate 130 of the optical axis correction part 34 by an amount corresponding to the difference inputted from the amplification circuit 104 in order to move the optical axis. On the other hand, the motor 107 swings the second plate 131 by an amount corresponding to the difference inputted from the amplification circuit 106 in order to move the optical axis. The amounts of movements of these optical axes correspond to a half of the pixel pitch respectively.

Figure 5:
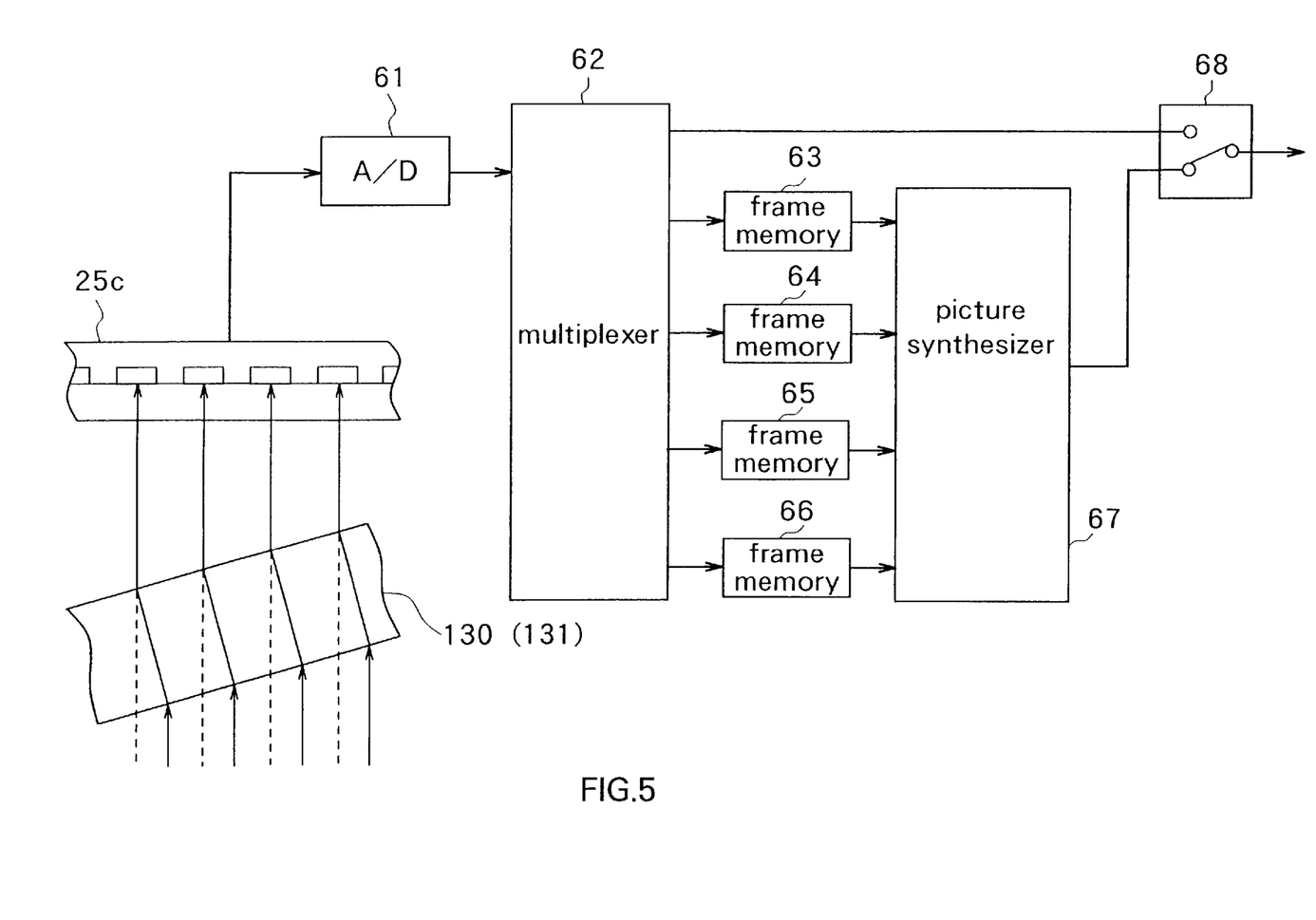
FIG. 5 is a block diagram showing structure of the signal processing part shown in FIG. 2.

FIG. 5 is a block diagram showing structure of the signal processing part 25D shown in FIG. 2. The signal processing part 25D comprises an A/D convert 61 for performing analog-to-digital (hereinafter referred to as "A/D") conversion of an output signal from the image pickup device 25C so as to be outputted as image data, a multiplexer 62 for selectively outputting the output image data from the A/D convert 61 from any of first to fifth output terminals, four frame memories 63 to 66, connected to second to fifth terminals of the multiplexer 62 respectively, for storing picture data outputted from the multiplexer 62, an image synthesizer circuit 67 for synthesizing the image data stored in the frame memories 63 to 66 so as to produce one piece of image data of high resolution, and a switch 68 for selectively outputting either of the image data outputted from the first output terminal of the multiplexer 62 or the image data outputted from the image synthesizer circuit 67.

Then, operation of the telecine apparatus 1 shown in FIG. 1 will be explained. When using this telecine apparatus 1, a user first selects the first operation mode or the second operation mode with the mode changeover switch 4.

First, operation in the first operation mode will be explained. In the first operation mode, the movie film 10 pulled out from the supply reel 11 is supplied through the rollers 15 and 16 to the digital audio reproducing part 51. In the digital audio reproducing part 51, digital pattern images obtained by data detection light irradiated from the light source part 52 passing through the movie film 10 are detected by the digital audio sensor 53, and, based on these images, digital audio information is sequentially reproduced.

Then, the movie film 10 is supplied to the gate part 19 in the video reproducing part 12 through the sprocket 17 and the sprocket shoe 18. The light source 24A in the lamp house part 24 irradiates projection light L1. The projection light L1 is incident on the movie film 10 through the projection shutter 24B and the aperture provided in the picture gate 21. Here, the main control part 37 sends the control signal S5 to the servo motor control part 38 to rotate intermittent feeding sprocket 23A of the intermittent feeding part 20 by a predetermined angle at a predetermined timing, whereby stopping the movie film 10 intemittently at the gate part 19. At the same time, the main control part 37 sends the control signal S6 to the shutter motor control part 39 to rotate motor 24C by a predetermined angle at a predetermined timing so as to control open or close operation of the shutter 24B. Thus, the main control part 37 synchronizes catch feeding operation by the intermittent feeding sprocket 23A with the open or close operation of the shutter 24B.

Figure 6A:
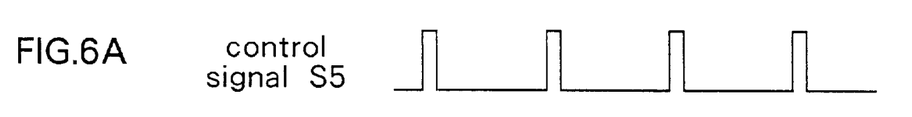
FIGS. 6A and 6B are an explanatory views for explaining operation in a first operation mode of a telecine apparatus according to an embodiment of the invention.
Figure 6B:
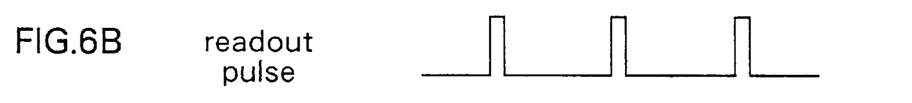

FIGS. 6A and 6B show timing of operation in case the first operation mode has been selected. FIG. 6A shows the control signal S5, and FIG. 6B shows readout pulse. The servo motor control part 38 feeds the movie film 10 by one frame when the control signal S5 comes to H (high) level. The image pickup device 25C performs readout when the readout pulse comes to H level. In case the first operation mode has been selected, the main control part 37 does not perform catch feeding operation by the intermittent feeding sprocket 23A from opened state through closed state of the projection shutter 24B, but, after performing catch feeding operation within a predetermined period of time from the closed state, before the projection shutter 24B comes to opened state, cause the optical axis correction part 34 to correct the optical axis of the movie film 10. In other words, first, next new frame of the movie film 10 is fed, and the movie film 10 is positioned. The position sensor 22B provided in the gate part 19 detects signals corresponding to positional shifts in vertical direction of the screen and horizontal direction of the screen from the stop position of the movie film 10 and sends these signals to the position signal detection part 36. Based on these signals, the position signal detection part 36 generates a vertical positional shift signal S1 and a horizontal positional shift signal S2 representing positional shifts and outputs these signals to the drive control part 35 and the main control part 37. Based on the vertical positional shift signal S1, the drive control part 35 swings the first plate 130 of the optical axis correction part 34 in order to correct optical axis for the vertical direction. Also, based on the horizontal positional shift signal S2, the drive control part 35 swings the second plate 131 in order to correct optical axis for the horizontal direction.

On the other hand, the CCD camera 25 fetches, during opened state of the projection shutter 24B, images for one frame based on the transmitted light of the movie film 10 irradiated to the image pickup device 25C. The images fetched from the the image pickup device 25C are A/D converted by the A/D converter 61 in the signal processing part 25D. In the first operation mode, the multiplexer 62 in the signal processing part 25D outputs an output signal from the A/D converter 61 via the first output terminal, and the switch 68 selectively outputs an output signal from the first output terminal of the multiplexer 62. Therefore, the output signal from the A/D converter 61 is outputted via the multiplexer 62 and the switch 68, without passing through the frame moeries 63 to 66.

Then, operation in the second operation mode will be explained with reference to the FIGS. 7 and 8A to 8D. FIG.

Figure 7:
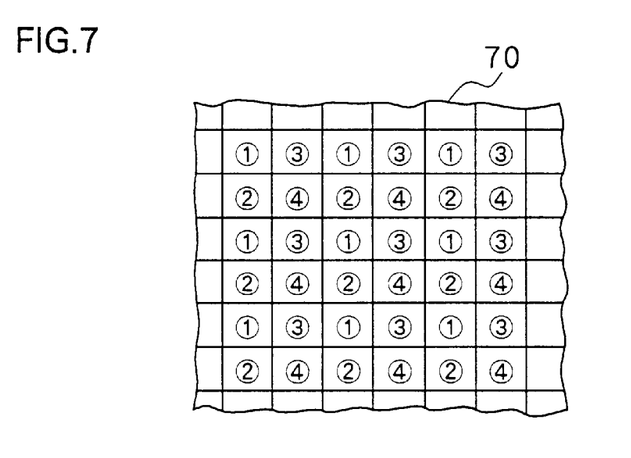
FIG. 7 is an explanatory view for explaining operation in a second operation mode of a telecine apparatus according to an embodiment of the invention.
Figure 8A:
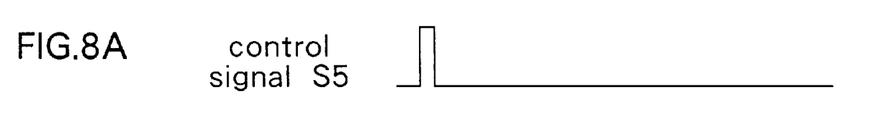
FIGS. 8A to 8D are an explanatory views for explaining operation in a second operation mode of a telecine apparatus according to an embodiment of the invention.
Figure 8B:
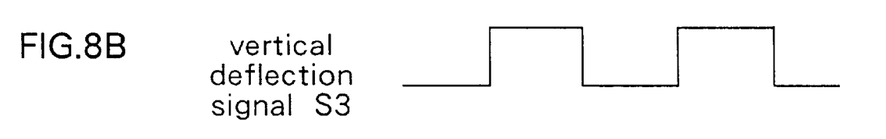
Figure 8C:
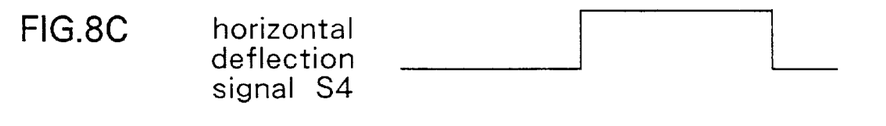
Figure 8D:
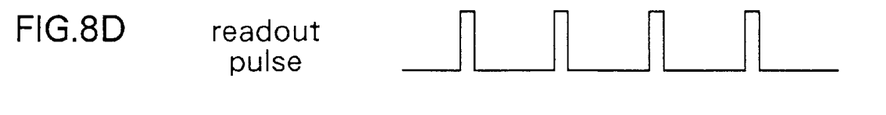

7 shows the order of fetching of image information to be fetched, and the numeral 70 in this figure represents the image information to be fetched, and "1" to "4" represent the order of positions of the image information to be fetched. FIGS. 8A to 8D show timing of operation. FIG. 8A shows the control signal S5. FIG. 8B shows the vertical deflection signal S3. FIG. 8C shows horizontal deflection signal S4. FIG. 8D shows readout pulse. When the vertical deflection signal S3 is in L (low) level, the optical axis on the incicent side and the optical axis on the outgoing side coincide. When the vertical deflection signal S3 is in H level, the signal S3 moves the optical axis on the outgoing side in the vertical direction by a half of the pixel pitch in the image pickup device 25C with respect to the optical axis on the incicent side. Similarly, when the horizontal deflection signal S4 is in L level, the optical axis on the incident side and the optical axis on the outgoing side coincide. When the horizontcal deflection signal S4 is in H level, the signal S4 moves the optical axis on the outgoing side in the horizontal direction by a half of the pixel pitch in the image pickup device 25C with respect to the optical axis on the incicent side.

When next new frame of the movie film 10 is fed according to the control signal S5, the movie film 10 is positioned, and, first, in a state the optical axis on the incicent side and the optical axis on the outgoing side coincide in the optical axis correction part 34, a first fetching of image information by the CCD camera 25 is performed. Hereby, image information in the position "1" in FIG. 7 on the movie film 10 is fetched by the CCD camera 25, and this image information is stored in the frame memory 63 via the A/D converter 61 and the multiplexer 62 in the signal processing part 25D.

Then, the main control part 37 sends the vertical deflection signal S3 to the drive control part 35 in the optical axis control part 32. Based on the vertical deflection signal S3, the drive control part 35 drives motor 105 in the optical axis correction part 34 to swing the first plate 130 in order to move the opticals axis in the vertical direction by a half of the pixel pitch in the image pickup device 25C. After moving the optical axis, by the CCD camera 25, image information in the position "2" which is shifted in the vertical direction by a half of the pixel pitch in the image pickup device 25C with respect to the position "1" is fetched and this image information is stored in the frame memory 64 via the A/D converter 61 and the multiplexer 62 in the signal processing part 25D.

Then, the main control part 37 sends the horizontal deflection signal S4 to the drive control part 35 in the optical axis control part 32. Based on the horizontal deflection signal S4, the drive control part 35 drives motor 107 in the optical axis correction part 34 to swing the second plate 131 in order to move the optical axis in the horizontal direction by a half of the pixel pitch in the image pickup device 25C. After moving the optical axis, by the CCD camera 25, image information in the position "3" which is shifted in the horizontal direction by a half of the pixel pitch in the image pickup device 25C with respect to the position "1" is fetched, and this image information is stored in the frame memory 65 via the A/D converter 61 and the multiplexer 62 in the signal processing part 25D.

Then, the main control part 37 sends the vertical deflection signal S3 and the horizontal deflection signal S4 to the drive control part 35 in the optical axis control part 32. Based on the vertical deflection signal S3 and the horizontal deflection signal S4, the drive control part 35 drives motors 105 and 107 in the optical axis correction part 34 to swing the first and second plates 130 and 131 in order to move the optical axis in the vertical direction and the horizontal direction by a half of the pixel pitch in the image pickup device 25C. After moving the optical axis, by the CCD camera 25, image information in the position "4" which is shifted in the vertical direction and the horizontal direction by a half of the pixel pitch in the image pickup device 25C with respect to the position "1" is fetched, and this image information is stored in the frame memory 66 via the A/D converter 61 and the multiplexer 62 in the signal processing part 25D.

When the image information in positions "1" to "4" are fetched into the frame memories 63 to 66, the image synthesizer circuit 67 in the signal processing part 25D synthesizes image data in the frame memories 63 to 66 and outputs one piece of image data of high resolution (four times of resolution in the first operation mode) as a video signal Sv. In this connection, if the optical axis is not moved in the vertical direction and the horizontal direction, merely image information in the position "1" can be fetched.

Then, after the fetching of image information in the position "4", the first and second plates 130 and 131 are rearranged to be parallel with each other. In this connection, in the second operation mode, feeding of the movie film does not need to performed at a fixed time interval as in the first operation mode, and can be performed at an arbitrary timing in response to instructions by means of an operation button not shown.

As explained above, according the embodiment, by the mode changeover switch 4, the first operation mode in which images of respective frames of the movie film 10 are sequentially picked up in real time and correction of image shift is made and the second operation mode in which pickups in a plurality of optical axis positions are performed to the same frame can be selected, so that with one single telecine apparatus 1, process of converting images recorded on a movie film into video signals in real time and process of converting images recorded on a movie film into video signals with high resolution can be implemented.

Also, according to the embodiment, in the first operation mode, image shift can be prevented. Furthermore, according to the embodiment, correction of image shift in the first operation mode and movement of optical axis in the second operation mode can be performed by means of the same optical axis correction part 34, so that with one single optical axis correction part 34, both the correction of image shift and the high resolution pickup can be implemented.

In this connection, the invention is not limeted to the embodiment described above. For example, in the second operation mode, it is possible, for one frame, to pickup image in the position "1" and image in the position "4" in FIG. 7 and obtain, with image data in these two positions, image data in the position "2" and image data in the position "3" by interpolation.

As explained above, according to an image pickup apparatus for image film in the invention, in the first operation mode, a film is fed intermittently by the film feeding means and images of respective frames of the film can be sequentially picked up by the image pickup means, and in the second operation mode, to the same frame of the stopped at the image pickup position, a plurality of optical axis positions are selected with the optical axis position moving means, and, for respective optical axis positions, image of the frame can be picked up by the image pickup means, so that the invention has an effect that with one single apparatus, process of converting images recorded on a film into video signals in real time and process of converting images recorded on a film into video signals with high resolution can be implemented.

Also, according to another image pickup apparatus for image film in the invention, furthermore, in the first operation mode, based on the result of detection by the position detection means, the optical axis position moving means can be controlled so as to correct shift of relative positional relationship between the frame of the film at the image pickup position and the image pickup means, so that the invention has an effect that by means of one optical axis position moving means, both the correction of image shift and the high resolution pickup can be implemented.

Also, according to still another image pickup apparatus for image film in the invention, an image synthesizing means is provided for synthesizing video signals corresponding to a plurality of images obtained for respective optical axis positions for the same frame of the film so as to produce one piece of image in the second operation mode, so that the invention has an effect that in the image pickup apparatus, image information of high resolution can be produced.

Obviously many modifications and variations of the present invention are possible in the light of the above teachings. It is therefore to be understood that within the scope of the appended claims the invention may be practiced otherwise than as specifically described.

What is claimed is:

1. An image pickup apparatus for image film comprising:
    a film feeding means capable of intermittently feeding a film on which information including image information is recorded so as to intermittently stop each frame of the film at a predetermined image pickup position;
    a light irradiating means for irradiating light to the frame of the film stopped at the image pickup position;
    an image pickup means for picking up an image of the frame of the film which stopped at the image pickup position and to which light is irradiated by said light irradiating means and for converting the image into a video signal;
    an optical axis position moving means capable of moving an optical axis position of a light from the frame of the film stopped at the image pickup position to the image pickup means;
    a control means for controlling said film feeding means, image pickup means and optical axis position moving means and capable of selecting a first operation mode in which said film is intermittently fed by said film feeding means and images of respective frames of said film are sequentially picked up by the image pickup means, and a second operation mode in which, to the same frame of said film stopped at the image pickup position, a plurality of optical axis positions are selected with said optical axis position moving means, and, for respective optical axis positions, the image of the frame is picked up by the image pickup means; and
    a position detection means for detecting the position of said film passing through said image pickup position, wherein said control means controls said optical axis position moving means so as to correct shift of a positional relationship between the frame of said film at said image pickup position and said image pickup means based on the result of film position detection in said first operation mode.

2. An image pickup apparatus for image film according to claim 1 wherein said position detection means is provided between said light irradiating means and said image pickup means and in the vicinity of said image pickup position.

3. An image pickup apparatus for image film according to claim 1 further comprising an image synthesizing means for synthesizing video signals corresponding to a plurality of images obtained for respective optical axis positions for the same frame of said film so as to produce one high resolution image for the frame in said second operation mode.

4. An image pickup apparatus for image film according to claim 1 wherein amount of movement of optical axis position by said optical axis position moving means in said second operation mode is an amount corresponding to one half of the pixel pitch in said image pickup means.

5. An image pickup apparatus for image film according to claim 1 wherein direction of movement and amount of movement of optical axis position by said optical axis position moving means in said second operation mode are vertical direction, horizontal direction or diagonally 45 degrees and an amount corresponding to one half of the pixel pitch in said image pickup means, respectively.

6. An image pickup apparatus for image film according to claim 1, wherein said film is a movie film.

7. An image pickup apparatus for image film comprising:
    a film feeding part capable of intermittently feeding a film on which information including image information is recorded so as to intermittently stop each frame of the film at a predetermined image pickup position;
    a light irradiating part for irradiating light to the frame of the film stopped at the image pickup position;
    an image pickup part for picking up an image of the frame of the film which stopped at the image pickup position and to which light is irradiated by said light irradiating part and for converting the image into a video signal;
    an optical axis position moving part capable of moving an optical axis position of a light from the frame of the film stopped at the image pickup position to the image pickup part;
    a controller for controlling said film feeding part, image pickup part and optical axis position moving part and capable of selecting a first operation mode in which said film is intermittently fed by said film feeding part and images of respective frames of said film are sequentially picked up by the image pickup part, and a second operation mode in which, to the same frame of said film stopped at the image pickup position, a plurality of optical axis positions are selected with said optical axis position moving part, and, for respective optical axis positions, the image of the frame is picked up by the image pickup part; and
    a position detection part for detecting the position of said film passing through said image pickup position in said first operation mode, wherein said controller controls said optical axis position moving part so as to correct shift of a positional relationship between the frame of said film at said image pickup position and said image pickup part based on the result of said film position detection.

8. An image pickup apparatus for image film according to claim 7 wherein said position detection part is provided between said light irradiating part and said image pickup part and in the vicinity of said image pickup position.

9. An image pickup apparatus for image film according to claim 7, further comprising an image synthesizing part for synthesizing video signals corresponding to a plurality of images obtained for respective optical axis positions for the same frame of said film so as to produce one high resolution image for the frame in said second operation mode.

10. An image pickup apparatus for image film according to claim 7 wherein amount of movement of optical axis position by said optical axis position moving part in said second operation mode is an amount corresponding to one half of the pixel pitch in said image pickup part.

11. An image pickup apparatus for image film according to claim 7, wherein direction of movement and amount of movement of optical axis position by said optical axis position moving part in said second operation mode are vertical direction, horizontal direction or diagonally 45 degrees and an amount corresponding to one half of the pixel pitch in said image pickup part, respectively.

12. An image pickup apparatus for image film according to claim 7, wherein said film is a movie film.

* * * * *